United States Patent [19]
Hinata et al.

[11] Patent Number: 5,687,465
[45] Date of Patent: Nov. 18, 1997

[54] METHOD OF REMOVING A BUBBLE FROM A LIQUID CRYSTAL DISPLAY ELEMENT

[75] Inventors: Shoji Hinata; Yoichi Ono, both of Suwa, Japan

[73] Assignee: Seiko Epson Corporation, Tokyo, Japan

[21] Appl. No.: 438,032

[22] Filed: May 8, 1995

Related U.S. Application Data

[60] Continuation of Ser. No. 53,570, Apr. 28, 1993, abandoned, which is a division of Ser. No. 922,376, Jul. 31, 1992, abandoned.

[30] Foreign Application Priority Data

| Aug. 1, 1991 | [JP] | Japan | 3-192972 |
| Aug. 1, 1991 | [JP] | Japan | 3-192973 |
| Jun. 29, 1992 | [JP] | Japan | 4-170335 |
| Jun. 29, 1992 | [JP] | Japan | 4-170336 |
| Jun. 29, 1992 | [JP] | Japan | 4-170337 |
| Jun. 29, 1992 | [JP] | Japan | 4-170338 |
| Jul. 1, 1992 | [JP] | Japan | 4-174140 |

[51] Int. Cl.$^6$ ............................... B29C 73/00
[52] U.S. Cl. .................. 29/402.01; 29/402.04; 29/DIG. 44; 156/94; 156/286; 264/36; 264/102; 349/187
[58] Field of Search .............. 156/94, 286; 264/36, 264/102, 571; 29/402.01, 402.02, DIG. 44, 402.04; 359/62, 74, 80, 81; 349/84, 187, 192

[56] References Cited

U.S. PATENT DOCUMENTS

| 1,755,274 | 4/1930 | Sherts et al. ............ 156/94 |
| 4,292,370 | 9/1981 | Pekko . | |
| 4,315,668 | 2/1982 | Aftergut et al. . | |
| 4,387,133 | 6/1983 | Ichikawa et al. . | |
| 4,640,584 | 2/1987 | Tsubakimoto et al. . | |
| 4,695,490 | 9/1987 | McClelland et al. . | |
| 4,709,991 | 12/1987 | Hoshikawa . | |
| 4,859,034 | 8/1989 | Shiraishi . | |
| 4,966,442 | 10/1990 | Ono et al. . | |
| 5,147,485 | 9/1992 | Gajewski ................. 156/286 |
| 5,150,239 | 9/1992 | Watanabe et al. . | |

FOREIGN PATENT DOCUMENTS

| 0 327 071 | 8/1989 | European Pat. Off. . | |
| 127518 | 10/1980 | Japan ........... 359/62 |
| 139720 | 8/1982 | Japan ........... 359/62 |
| 57 182 721 | 11/1982 | Japan . | |
| 58-35515 | 3/1983 | Japan . | |
| 60421 | 4/1984 | Japan ........... 359/83 |
| 271316 | 11/1988 | Japan ........... 359/62 |
| 146522 | 6/1990 | Japan ........... 359/62 |
| 4 036 725 | 2/1992 | Japan . | |

*Primary Examiner*—Steven D. Maki
*Attorney, Agent, or Firm*—Oliff & Berridge

[57] ABSTRACT

A liquid crystal display element utilizing flexible gas barrier films decreases poor display performance caused by bubble formation. This decrease is achieved by reducing the permeation of gas and water vapor from the gas barrier films into substrates by devising the structure of the element and the configuration in which the element is mounted. Specifically, edges of the substrates forming the liquid crystal display elements are sealed. Additionally, the gas and water vapor saturation solubilities of the liquid crystal material is controlled to improve resistance to bubble formation. The liquid crystal display elements can also be subjected to and/or stored in a reduced pressure. Electronic equipment incorporating liquid crystal display elements can include a guard plate having a minimum thickness and/or spacing from the display elements.

2 Claims, 10 Drawing Sheets

METHOD OF REMOVING A BUBBLE FROM A LIQUID CRYSTAL DISPLAY ELEMENT

This is a Continuation of application Ser. No. 08/053,570 filed Apr. 28, 1993, now abandoned, which in turn is a Divisional of application Ser. No. 07/922,376 filed Jul. 31, 1992, now abandoned.

BACKGROUND OF THE INVENTION

1. Field of the Invention

The present invention relates to a liquid crystal display element utilizing flexible substrates, methods of producing and storing liquid crystal display elements, and electronic equipment on which liquid crystal display elements are mounted.

2. Description of the Related Art

It is known to use flexible substrates, such as plastic films, in liquid crystal display elements. Typically, however, such liquid crystal display elements are produced in the same manner as those using glass substrates. For instance, the edges of liquid crystal display elements using flexible substrates, such as plastic films, are typically not subjected to a gas barrier treatment. In addition, the liquid crystal material of liquid crystal display elements using flexible substrates are typically produced in the same manner as the liquid crystal material of liquid crystal display elements using glass substrates, i.e., without controlling the solubility and the degree of saturation of gas in the liquid crystal material. Still further, the typical number of spacers provided in liquid crystal display elements using flexible substrates, so as to space two substrates forming the elements from each other by a fixed distance, ranges from 100 to 150 spacers per $mm^2$.

Liquid crystal display elements using flexible substrates, such as plastic films, typically have not been reclaimed (i.e., repaired) after the formation of a bubble renders them undesirable for use.

Liquid crystal display elements using flexible substrates, such as plastic films, have been stored at atmospheric pressure and temperature in the same way as liquid crystal display elements using glass substrates.

The structure of electronic equipment on which liquid crystal display elements comprised of flexible substrates, such as plastic films, are mounted is such that external pressure is directly applied to the liquid crystal display elements in the same manner as the structure of electronic equipment on which liquid crystal display elements using glass substrates are mounted.

SUMMARY OF THE INVENTION

However, in liquid crystal display elements comprised of flexible substrates, such as plastic films, unlike glass substrates, the plastic films themselves have permeability to gas or water vapor. Therefore, when the liquid crystal display element is stored or used at atmospheric pressure and temperature, gas or water vapor permeates the plastic substrates, thus entering into the liquid crystal material. The flexible substrates of the liquid crystal display element are likely to be deformed by external force if the display surface is impacted, for example, by being pressed by a finger or by being dropped. When gas or the like in the liquid crystal material becomes saturated, such deformation of the flexible substrates may cause bubbles to form inside the liquid crystal display element, resulting in poor display performance.

The present invention solves the above-described problems which exist in previous devices.

An object of the present invention is to provide a method of producing a highly reliable liquid crystal display element in which the formation of bubbles is avoided, even when the liquid crystal display element is used or stored over long periods of time.

Another object of the present invention is to provide electronic equipment on which such a liquid crystal display element is mounted.

In order to achieve the above and other objects, and to overcome the shortcomings set forth above, end sections (edges) of the flexible substrates of a liquid crystal display element are subjected to a gas barrier treatment. The liquid crystal display element includes a pair of flexible substrates, on which orientating films for orientating liquid crystal molecules are formed, bonded together by seal members with the aid of spacers so that the substrates face each other with a predetermined space therebetween. A liquid crystal material is sealed in the space between the substrates. The edges of the substrates of the liquid crystal display element are subjected to a gas barrier treatment by, for example, sealing the edges of the substrates.

The liquid crystal material of the above liquid crystal display preferably has an oxygen saturation solubility of not less than 10 µl/ml, a nitrogen saturation solubility of not less than 10 µl/ml or a saturation solubility of water vapor of not less than 100 ppm (parts per million), and the degree to which either oxygen, nitrogen or water vapor, or a mixture thereof, is saturated in the liquid crystal material, immediately after the production of the above liquid crystal display element, is not more than 0.9.

The number of spacers preferably ranges from 150 to 300 per $mm^2$, and hard coat layers having a hardness of not less than a pencil having a hardness of "H" are formed between inner surfaces of the film substrates and the orientating films.

If a bubble forms in the liquid crystal display element of the present invention, the element can be repaired by allowing it to stand at reduced pressure. Also, the liquid crystal display element of the present invention can be stored at a reduced pressure to further deter bubble formation.

The configuration of electronic equipment on which a liquid crystal display element of the present invention is mounted preferably is such that a guard plate having a thickness of not less than 0.5 mm is disposed not less than 0.5 mm over the liquid crystal display element.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
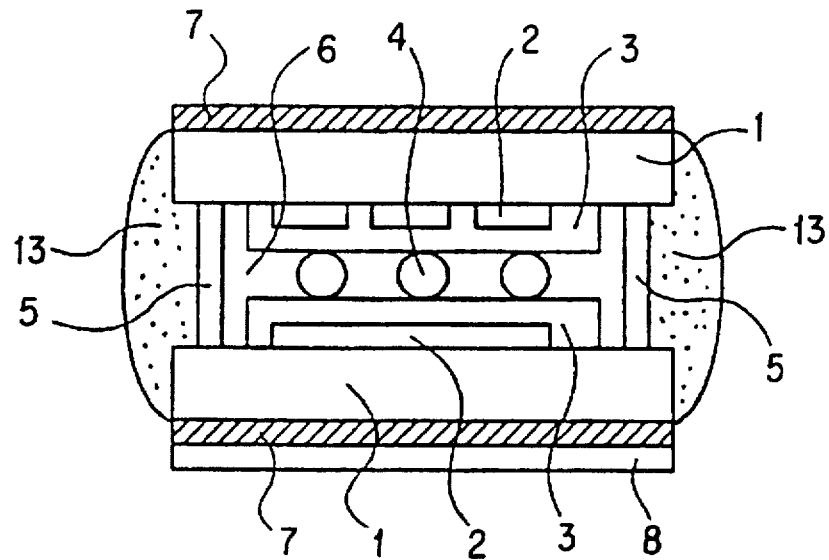
FIG. 1 is a view showing a section of a liquid crystal display element according to a first embodiment of the present invention.
Figure 10:
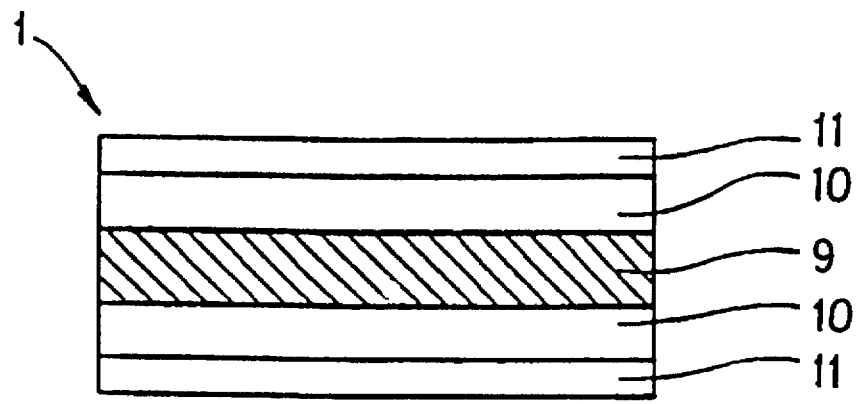
FIG. 10 is a view showing the structure of a gas barrier film according to one embodiment of the invention.

Referring to FIG. 1, reference numeral 1 denotes upper and lower substrates, both utilizing a gas barrier film. As shown in FIG. 10, the gas barrier film is formed by using a polycarbonate film 9 as a supporting substrate. EVA (ethylene-vinyl acetate copolymer) serving as a gas barrier layer 10, is applied to both sides of the polycarbonate film supporting substrate 9, and phenoxy resin providing a hard coat layer 11 and having a hardness of not less than a pencil having a hardness of "H" (hardness according to Japanese Industrial Standards, JIS K5400 item 6.14) is applied to both sides of the EVA gas barrier layer 10. Reference numeral 2 denotes transparent electrodes made of an ITO (indium-tin oxide) film, numeral 3 represents an orientating film, numeral 4 represents spacers, numeral 5 represents seal members, and numeral 6 represents a liquid crystal material.

Hardness relates to the scratch resistance of the hard coat layers, and is measured by attempting to scratch the surface with pencils having different densities and corresponding hardness numbers. Each pencil density can withstand a specified bending stress. Table 1 shows the classification symbols and the corresponding bending stresses for pencil hardness. A pencil hardness of "H" corresponds to a pencil capable of withstanding a bending stress of at least 50 MPa.

TABLE 1

| Density Symbols | Bending Stress (MPa) |
| --- | --- |
| 9H-7H | 78.5 or more |
| 6H and 5H | 68.6 or more |
| 4H-H | 58.5 or more |
| F and HB | 49.0 or more |
| B | 39.2 or more |
| 2B and 3B | 29.4 or more |
| 4B | 24.5 or more |
| 5B and 6B | 19.6 or more |

Hard coat layer 11 is capable of withstanding a scratch test performed by a pencil having a bending stress of at least 50.0 MPa. Thus, hard coat layer 11 has a hardness greater than the hardness of a pencil capable of withstanding a bending stress of at least 50.0 MPa.

A method of producing the liquid crystal display element of FIG. 1 includes forming the transparent electrodes 2 on the gas barrier film of substrates 1 by depositing the ITO with a low-temperature sputtering process, and then forming a predetermined electrode pattern by a photolithography process. The orientating film 3 is attached and calcined to the pattern by offset printing. The orientating film 3 is then rubbed with a cloth in a predetermined direction to undergo an alignment treatment. Then, an epoxy system adhesive, containing predetermined gap materials (not shown) is used to form seal members 5, by printing the epoxy system adhesive on one substrate by screen-process printing, as is conventional. The spacers 4 are sprayed on the substrate by a wet spray process. Then, the two substrates are bonded together so as to face each other. In a first embodiment, the number of spacers sprayed was 150 per mm$^2$. The liquid crystal material 6 is filled into the space between the substrates by a conventional vacuum injecting process, and is sealed between the substrates using an epoxy system adhesive.

As shown in FIG. 1, the liquid crystal cell is subjected to a gas barrier treatment in which an epoxy system adhesive 13 is applied to both edges of the liquid crystal cell, and then hardened. The gas barrier treatment seals the edges of substrates 1 by covering the edges of the substrates with epoxy system adhesive 13, which is impermeable to gas and water vapor.

Lastly, polarizing plates are affixed to the upper and lower sides of the cell.

After producing the liquid crystal display element of FIG. 1, another liquid crystal display element was produced in which the adhesive 13 was not applied to both edges (i.e., the gas barrier treatment was not performed). This second liquid crystal display element served as a comparison product.

Figure 12A:
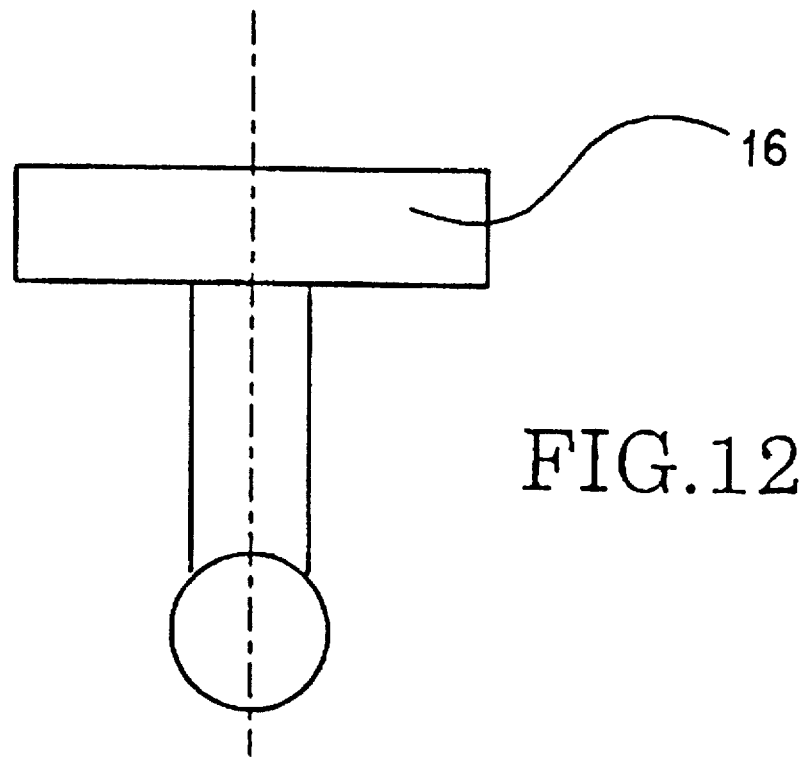
FIG. 12 is a view showing a pressure test tool used in testing liquid crystal elements constructed according to the invention.
Figure 12B:
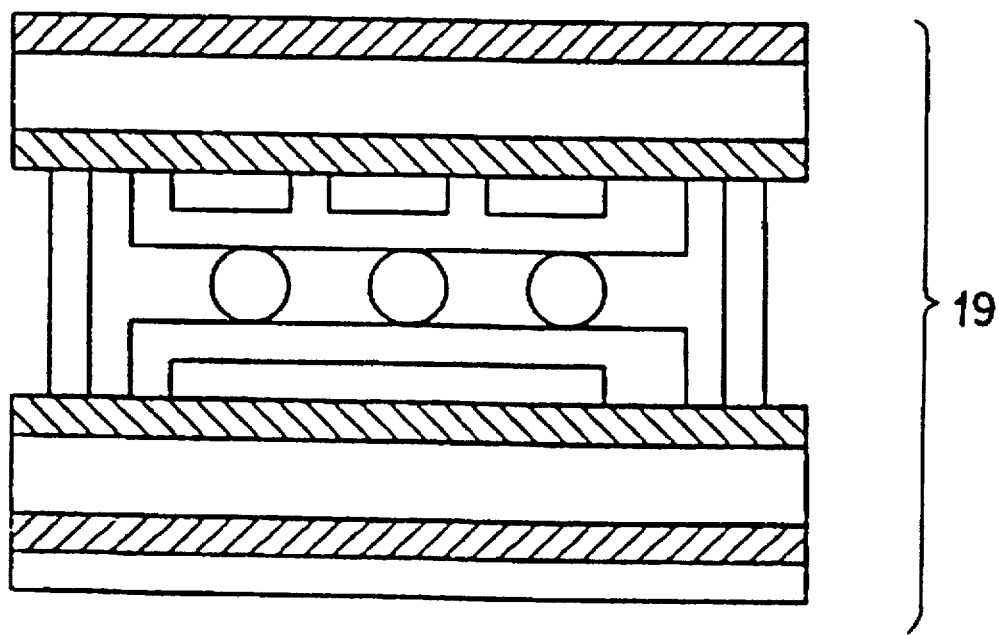
Figure 13:
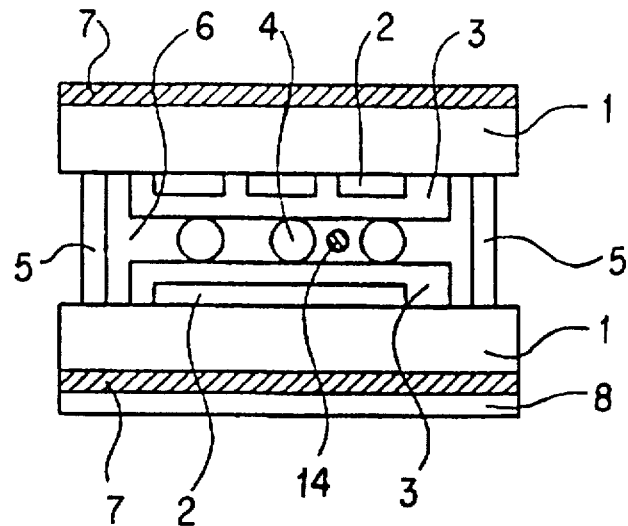
FIG. 13 is a view showing the nucleus of a bubble in a liquid crystal element.

The thus-produced liquid crystal display element of the present invention and the liquid crystal display element used as the comparison product were allowed to stand at atmospheric pressure and temperature. As shown in FIG. 12, a testing tool 16 having an approximately 1 cm diameter hard ball was used to apply a pressure of 2 kg for 3 seconds to the liquid crystal display elements so as to form the nucleus 14 of a bubble, which had a diameter of approximately 30 μm. A test was then conducted so as to measure the amount of time required for the nucleus 14 to disappear. In the test, liquid crystal display elements having the structure illustrated in FIG. 1 and liquid crystal display elements constructed according to the comparison product above were allowed to stand for equal amounts of time, and then a nucleus of a bubble was formed in the display elements as described above. The time required for the nucleus to disappear was then measured. For example, a nucleus was formed after the display elements were allowed to stand for about 3000 hrs., 6000 hrs., 8000 hrs., 10000 hrs., 15000 hrs., 20000 hrs. and 40000 hrs.

Figure 6:
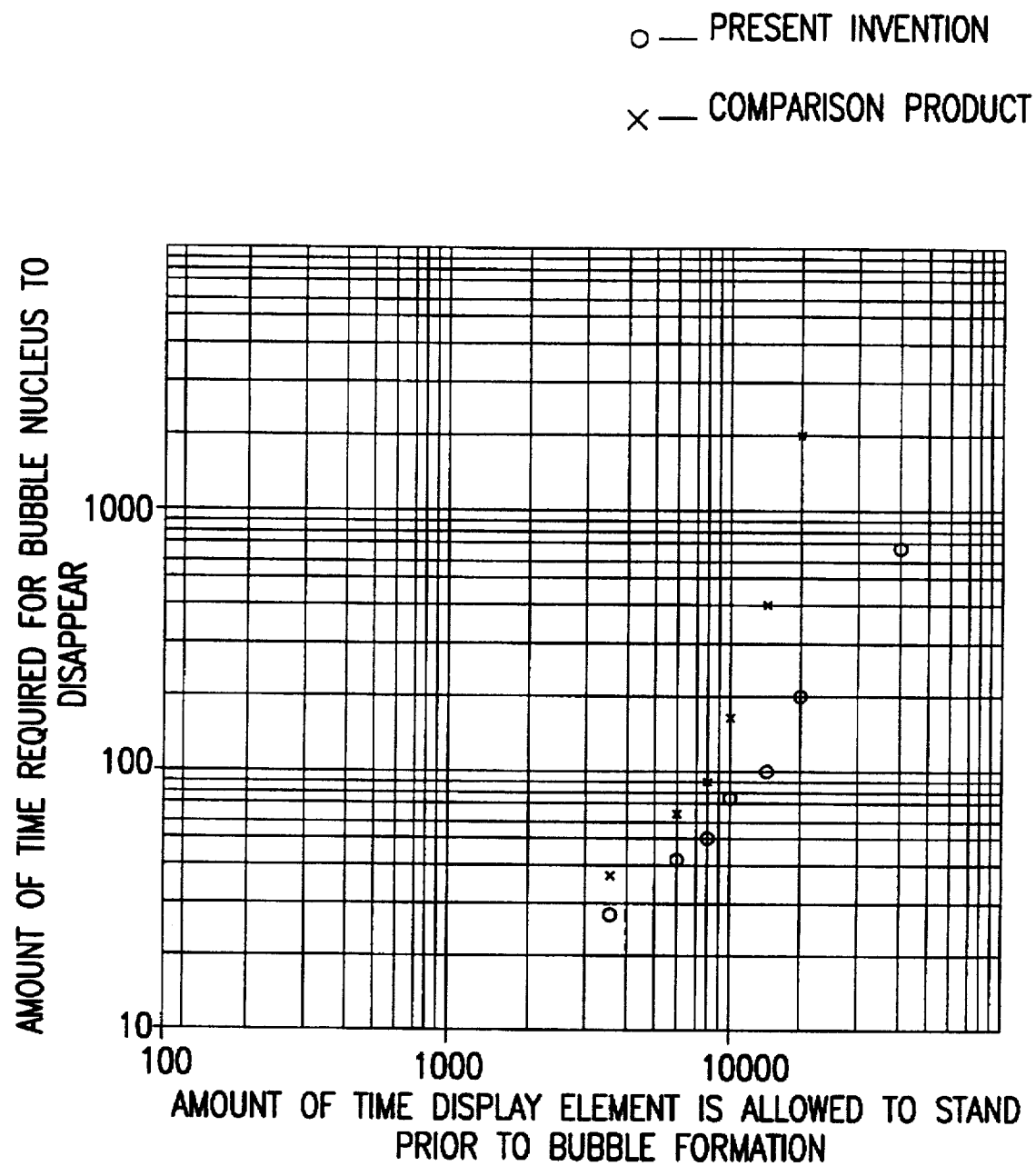
FIG. 6 is a view showing the relationship between the amount of time a liquid crystal display element is allowed to stand and the amount of time required for the nucleus of a bubble to disappear in accordance with a pressure test conducted on the first embodiment of the invention.
Figure 14:
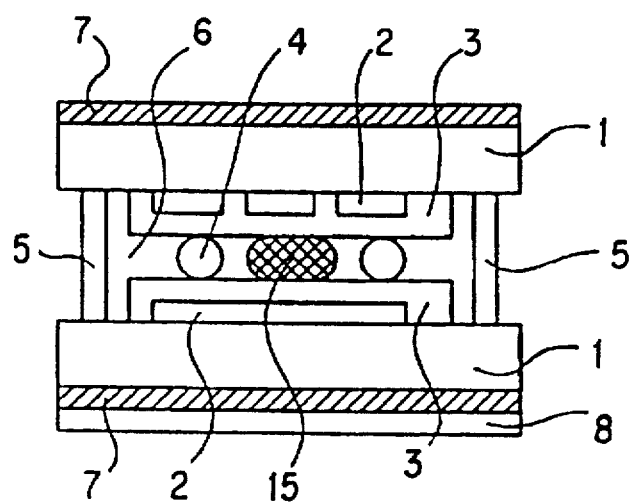
FIG. 14 is a view showing a bubble formed in a liquid crystal element.
Figure 15:
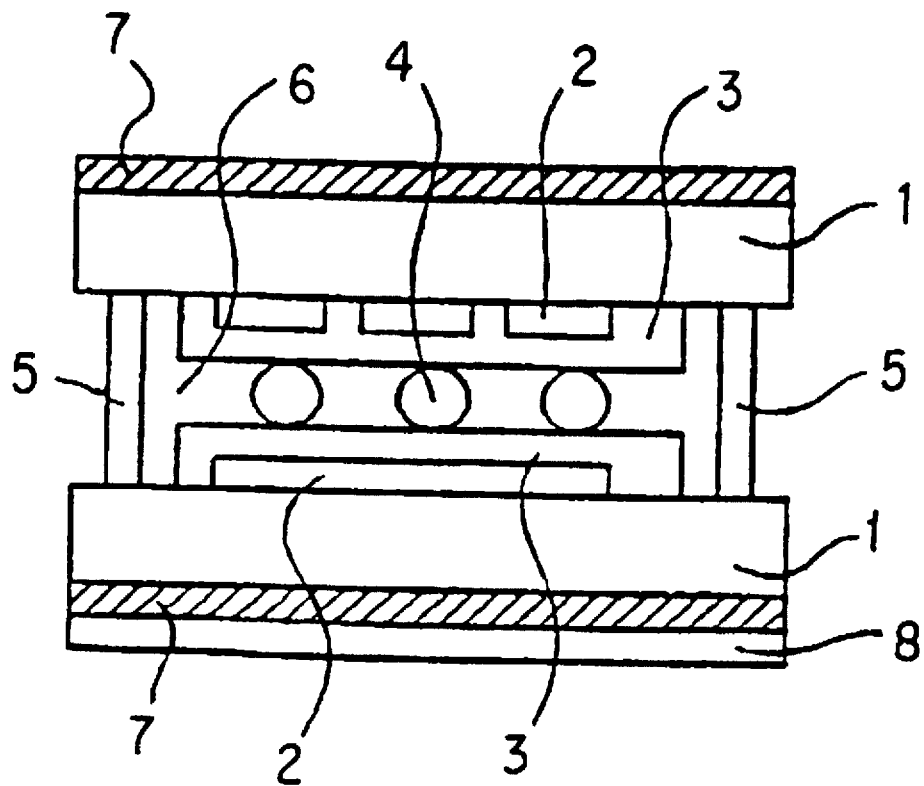
FIG. 15 is a view showing a section of a conventional liquid crystal display element.

As shown in FIG. 6, the amount of time required for the nucleus to disappear in the liquid crystal display element of the present invention (indicated by "O"), to which the epoxy adhesive was applied and hardened (i.e., the gas barrier treatment), and the amount of time required for the nucleus to disappear in the other liquid crystal display element (indicated by "X"), which was the comparison product, were different from each other. The results achieved by the present invention were always superior to those achieved with the comparison product. In fact, the nucleus of the bubble in the comparison product did not disappear when the bubble was formed after greater than 20000 hours, and, instead, formed into another bubble 15, as shown in FIG. 14. On the contrary, the nucleus of the bubble in the liquid crystal display element of the present invention disappeared even after it was formed after the display element was allowed to stand for 40000 hours.

Figure 2:
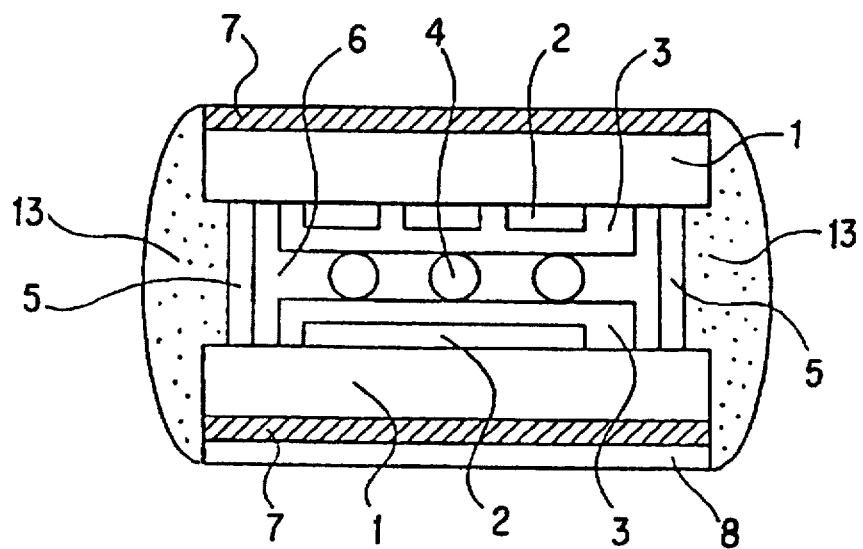
FIG. 2 is a view showing a section of a liquid crystal display element according to a second embodiment of the invention.

In a second embodiment, the same advantages as those discussed above were obtained with a liquid crystal display element in which, as shown in FIG. 2, polarizing plates 7 were affixed to the substrates 1, and then the epoxy adhesive 13 was applied to both edges of the liquid crystal display element.

Figure 3:
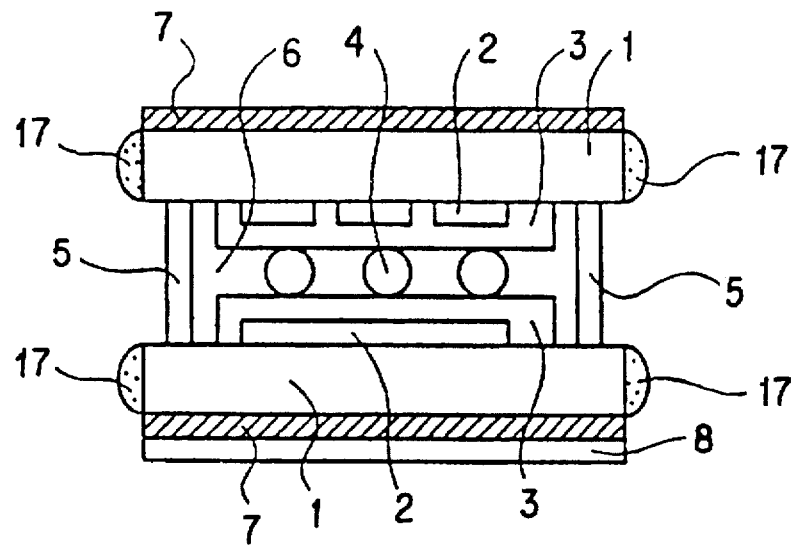
FIG. 3 is a view showing a section of a liquid crystal display element according to a third embodiment of the invention.

In a third embodiment, the same advantages as those discussed above were obtained with a liquid crystal display element in which, as shown by 17 in FIG. 3, both edges of the liquid crystal cell were sealed by being cut, for example, with a laser or by a hot knife having a temperature of, for example, 250° C., so that the edges of the substrates were welded and sealed.

Figure 4:
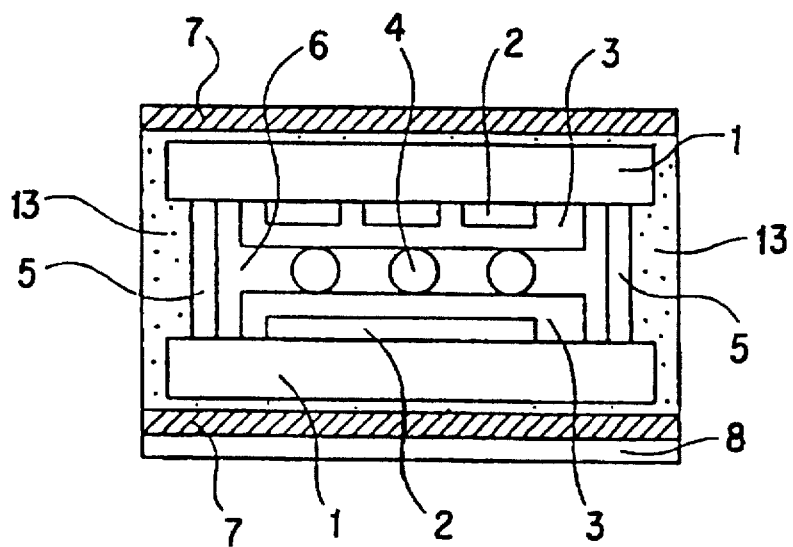
FIG. 4 is a view showing a section of a liquid crystal display element according to a fourth embodiment of the invention.

In a fourth embodiment, the same advantages as those described above were obtained with a liquid crystal display element in which, as shown in FIG. 4, the liquid crystal cell was immersed in the epoxy adhesive 13 to form a film on the entire liquid crystal cell, and then polarizing plates 7 were affixed to the substrates 1.

Figure 5:
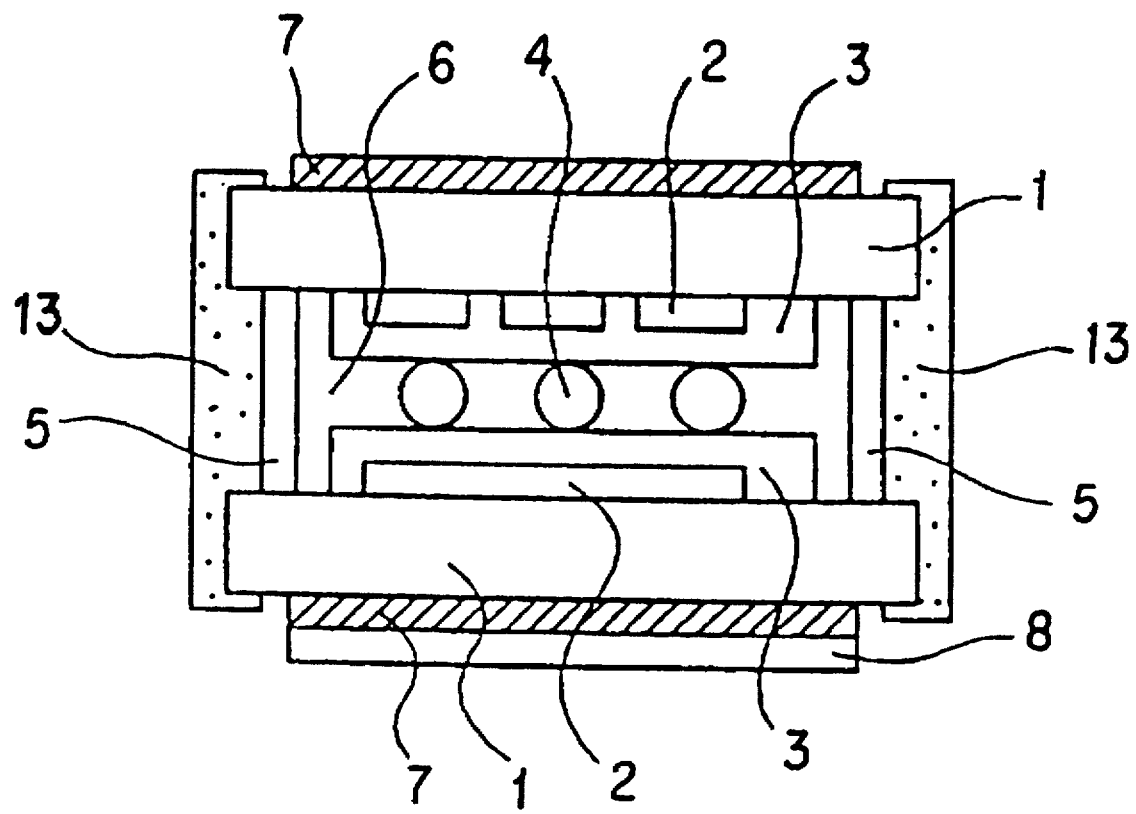
FIG. 5 is a view showing a section of a liquid crystal display element according to a fifth embodiment of the invention.

In a fifth embodiment, the same advantages as those described above were obtained with a liquid crystal display element in which, as shown in FIG. 5, only the edges of the liquid crystal cell were immersed in the epoxy adhesive 13 to form films.

Figure 11:
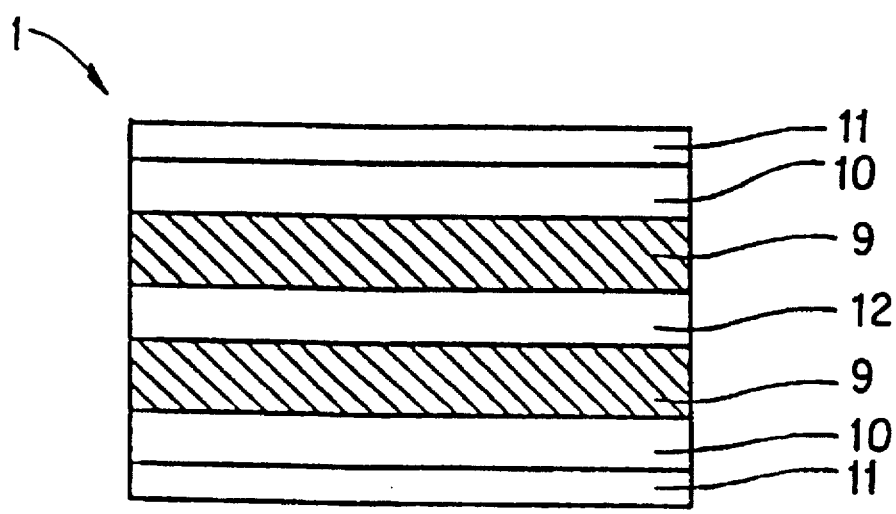
FIG. 11 is a view showing the structure of a gas barrier film according to another embodiment of the invention.

In another embodiment, the film used as a gas barrier film as described above was formed as shown in FIG. 11. A polarizing element film 12 was sandwiched between other films, each comprised of the polycarbonate film supporting substrate 9, EVA gas barrier film 10 and phenoxy resin hard coat layer 11. In the same way as the method described above, the epoxy adhesive 13 was applied to both edges of the liquid crystal cell and hardened. In this embodiment, polarizing plates 7 were not required. When a pressure test was conducted on the liquid crystal display element in the same manner as described with respect to FIG. 12, the same advantages as those described above were obtained.

When other resins, such as, for example, EVA and PVA (polyvinyl alcohol) are used for the gas barrier treatment, instead of the epoxy system adhesive, the same advantages described above were obtained.

In a liquid crystal display element utilizing a gas barrier film comprised of a plurality of layers, the permeation of gas or water vapor into the liquid crystal was reduced by performing the gas barrier treatment described above, in which the edges of the substrates were covered with resin, such as an adhesive, or were otherwise sealed by, for example, being welded by heat or the like.

Using the method described in the first embodiment, a liquid crystal display element was produced using a liquid crystal material having an oxygen saturation solubility of not less than 10 μm/ml, and preferably not less than 50 μl/ml. The liquid crystal display element was allowed to stand for 200 days. Then, as shown in FIG. 12, a hard ball having a diameter of about 1 cm was used to apply a pressure of 2 kg for 3 seconds to the liquid crystal display element. No abnormality occurred as a result. By contrast, it was observed that a bubble was formed in a liquid crystal display element produced using a liquid crystal material having an oxygen saturation solubility of less than 10 μl/ml.

The same experiment was conducted using a liquid crystal material having a nitrogen saturation solubility of not less than 10 μl/ml, and preferably not less than 50 μl/ml. The liquid crystal display element was allowed to stand for 200 days. When the same pressure test was performed as in FIG. 12, it was observed that no abnormality occurred in the liquid crystal display element. However, it was found that a bubble was formed in a liquid crystal display element produced by using a liquid crystal material having a saturation solubility of nitrogen of less than 10 μl/ml.

The same experiment was conducted using a liquid crystal material having saturation solubility of water vapor of not less than 100 ppm, and preferably not less than 300 ppm. The liquid crystal display element was allowed to stand for 200 days. No abnormality occurred in the liquid crystal display element when the same pressure test as described above was carried out. Again, however, it was found that a bubble was formed in a liquid crystal display element produced by using a liquid crystal material having a saturation solubility of water vapor of less than 100 ppm.

A liquid crystal display element produced in the same manner as described in the first embodiment was allowed to stand for 200 days. The degree to which either oxygen, nitrogen or water vapor, or a mixture thereof, was saturated in the liquid crystal material, immediately after the production of the liquid crystal display element, was not more than 0.9, and preferably not more than 0.5. No abnormality occurred in the liquid crystal display element as a result of the pressure test of FIG. 12. However, it was observed that a bubble was formed in a liquid crystal display element in which the degree to which either oxygen, nitrogen or water vapor, or a mixture thereof, was saturated, was more than 1.

In another embodiment, three types of liquid crystal display elements were produced using the method described in the first embodiment, and were allowed to stand for 200 days. The number of spacers sprayed was 60 per mm² in the first type, 150 per mm² in the second type, and 300 per mm² in the third type. As shown in FIG. 12, a hard ball having a diameter of about 1 cm was used to apply a pressure of 2 kg for 3 seconds to the three types of liquid crystal display elements. It was observed that no abnormality occurred in the liquid crystal display elements in which the number of spacers sprayed was 150 and 300 per mm². It was found, however, that a bubble as shown in FIG. 14 was formed in the liquid crystal display element in which the number of spacers sprayed was 60 per mm².

In comparison, when the same pressure test was conducted for similar liquid crystal display elements having no hard coat layer 11, it was observed that bubbles such as that shown in FIG. 14 were formed in the liquid crystal display elements in which the number of spacers sprayed was 60, 150 and 300 per mm².

In yet another embodiment, the liquid crystal display element produced as in the first embodiment was allowed to stand for 200 days at normal pressure and temperature. It was then placed in a vacuum dryer under reduced pressure (substantially less than atmospheric such as, for example, 50 Torr) for 24 hours. As shown in FIG. 12, it was observed that when the hard ball having a diameter of about 1 cm was used to apply a pressure of 2 kg for 3 seconds to the liquid crystal display element, no abnormality occurred. However, it was found that a bubble as shown in FIG. 14 was formed in the liquid crystal display element which was only allowed to stand for 200 days (i.e., without being placed in a vacuum dryer under reduced pressure). Thus, placing the liquid crystal display element in a reduced pressure rendered it more resistant to bubble formation.

In another embodiment, a liquid crystal display as produced in the first embodiment was mounted on electronic equipment and used for more than 200 days. An impact was applied to the liquid crystal display element to form a bubble. The display element was then pressurized (under 3 kg/cm$^2$) in a pressurizing tank for 50 hours causing the bubble to disappear. Then, the display element was placed in a vacuum dryer under reduced pressure (50 Torr) for 24 hours. As shown in FIG. 12, when the hard ball having a diameter of about 1 cm was used to apply a pressure of 2 kg for 3 seconds to the liquid crystal display element, no bubbles were formed. Thus, placing a liquid crystal display element in a reduced pressure repaired it and rendered it more resistant to bubble formation.

In yet another embodiment, a similar liquid crystal display element was placed in a vacuum dryer under reduced pressure (50 Torr) immediately after it had been produced. It was kept under such a condition for 200 days. Another liquid crystal display element was allowed to stand for 200 days at normal pressure. As shown in FIG. 12, the hard ball having a diameter of about 1 cm was used to apply a pressure of 2 kg for 3 seconds to both of the liquid crystal display elements. No abnormality occurred in the liquid crystal display element which was stored at reduced pressure, however, a bubble, as shown in FIG. 14, was formed in the liquid crystal display element which was stored at atmospheric pressure.

Figure 7:
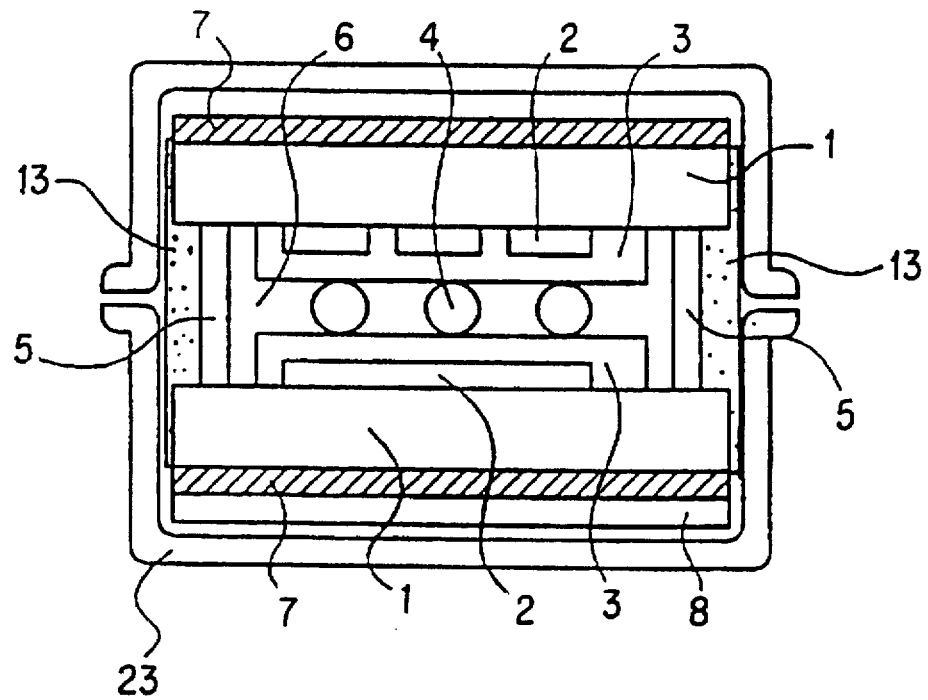
FIG. 7 is a view showing vacuum packing of an embodiment of the invention.

As shown in FIG. 7, when a liquid crystal display element was vacuum-packed by a film having gas barrier characteristics, the same advantages as those described above were obtained. Thus, storing a new liquid crystal display element in a reduced pressure maintained it resistant to bubble formation for a longer period of time.

Figure 8:
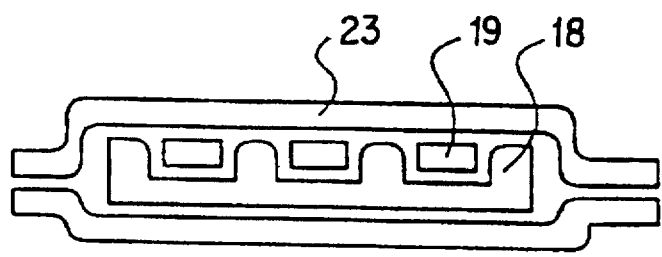
FIG. 8 is a view showing vacuum packing of plural liquid crystal elements.

As shown in FIG. 8, when a plurality of liquid crystal display elements were arranged side by side on a tray and vacuum-packaged by a film having gas barrier characteristics, the same advantages as those described above were obtained.

Figure 9:
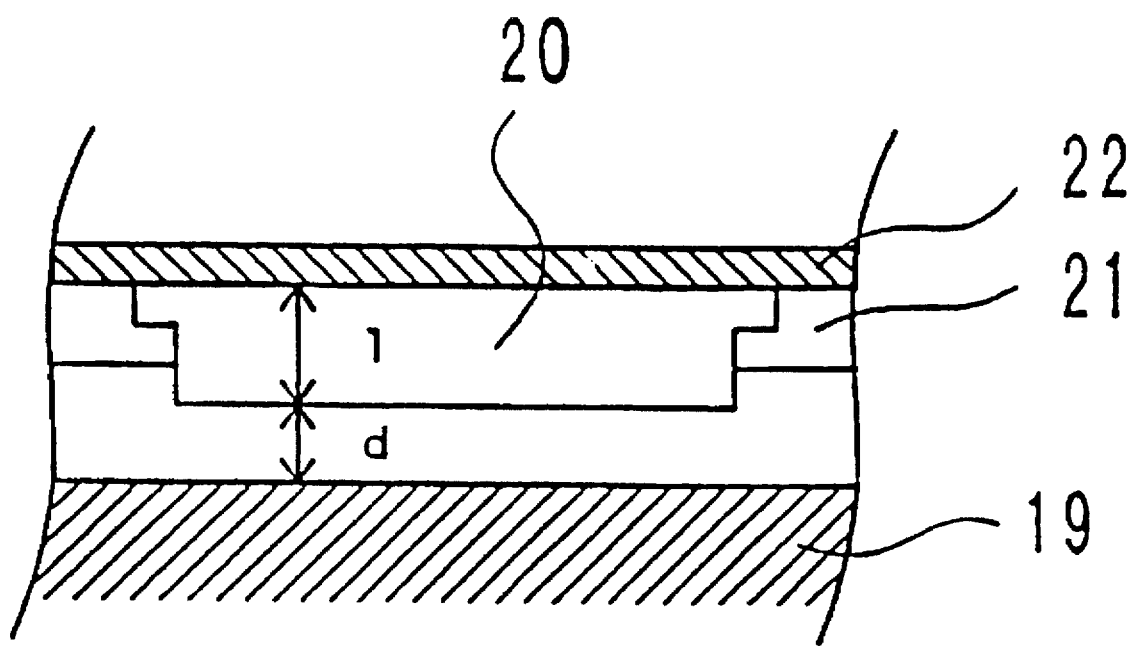
FIG. 9 is a view showing the structure of electronic equipment on which a liquid crystal display element is mounted.

In another embodiment, a liquid crystal display element as produced in the first embodiment was mounted on electronic equipment, such as a desktop computer, in accordance with an installation method as shown in FIG. 9. Reference numeral 20 denotes a guard plate, numeral 21 rerepresents external frames, and numeral 22 represents a decorative plate. The guard plate 20 is clamped by the external frames 21. The thickness 1 of the guard plate and the space d between the liquid crystal display element 19 and the guard plate 20 were set at the dimensions shown in Table 2. The liquid crystal display element 19 was mounted on the electronic equipment. A testing tool 16, such as one shown in FIG. 12, having a hard ball with a diameter of about 1 cm, was used to apply a pressure of 2 kg for 3 seconds to the electronic equipment in a direction perpendicular to the guard plate 20. "Bubble formation" in Table 2 indicates the configuration of electronic equipment in which a bubble 15, as shown in FIG. 14, was formed inside the liquid crystal display element. As is apparent from Table 2, the optimum structure of electronic equipment on which a liquid crystal display element of the present invention is mounted is such that the thickness of the guard plate is not less than 0.5 mm and the space between the guard plate and the liquid crystal display element is not less than 0.5 mm. No bubbles were formed in the liquid crystal display element when the configuration of the electronic equipment was as described above.

The liquid crystal display element of this invention is not limited to a desktop computer, but also can be used as a display device for various types of equipment, such as, for example, a pocket bell, an electronic pocket notebook, a meter instrument, a telephone set, a facsimile device, an IC card or a personal computer.

TABLE 2

| Space | Thickness 1 of guard plate (mm) | | | | |
|---|---|---|---|---|---|
| d(mm) | 0.2 | 0.3 | 0.5 | 0.7 | 1.0 |
| 0.0 | Bubble formation | Bubble formation | Unchanged | Unchanged | Unchanged |
| 0.2 | Bubble formation | Bubble formation | Unchanged | Unchanged | Unchanged |
| 0.5 | Unchanged | Unchanged | Unchanged | Unchanged | Unchanged |
| 0.8 | Unchanged | Unchanged | Unchanged | Unchanged | Unchanged |

As has been described above, in a liquid crystal display element and in the structure of electronic equipment on which such a display element is mounted, a pair of flexible substrates are bonded together by seal members. Orientating films are formed on the substrates for orientating liquid crystal molecules. Spacers are provided so that the substrates face each other with a predetermined space therebetween, the space being sealed. The edges of the substrates of the liquid crystal display element are subjected to a gas barrier treatment to reduce the permeation of gas or water vapor into the liquid crystal material.

In the present invention, the amount of time required for gas or water vapor to be saturated in the liquid crystal material of the liquid crystal display element is increased. This increase is achieved by using a liquid crystal which has an oxygen saturation solubility of not less than 10 μl/ml, a nitrogen saturation solubility of not less than 10 μl/ml or a saturation solubility of water vapor of not less than 100 ppm. The increase is also achieved by virtue of the fact that the degree to which either oxygen, nitrogen or water vapor, or a mixture thereof, is saturated in the liquid crystal material, immediately after the production of the liquid crystal display element, does not exceed 0.9. The number of spacers in the liquid crystal display element of the present invention ranges from 150 to 300 per mm$^2$. Hard coat layers having a hardness of not less than a pencil having a hardness of "H" or capable of withstanding a bending stress of at least 50.0 MPa are formed between the inner surfaces of the film substrates and the orientating films, thereby reducing the formation of bubbles caused by external forces. In the event a bubble forms in the liquid crystal display element, the liquid crystal display element is repaired by allowing it to stand at reduced pressure, which decreases the amount of gas or water vapor permeated into the liquid crystal. Similarly, the liquid crystal display element is stored at reduced pressure so as to decrease the permeation of gas or water vapor into the liquid crystal.

In the configuration of electronic equipment on which the liquid crystal display element of the present invention is mounted, a guard plate, having a thickness of 0.5 mm or more, is disposed over the liquid crystal display element. Also, the liquid crystal display element and the guard plate are arranged with a space of 0.5 mm or more between them. With this arrangement, the liquid crystal display element is protected from external force and the potential formation of bubbles. This invention provides a highly reliable liquid crystal display element which prevents poor display performance caused by bubbles and electronic equipment on which such a display element is mounted.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of removing a bubble formed in a liquid crystal material contained in a liquid crystal display element, said liquid crystal display element having a pair of flexible substrates sealed to each other by a sealing member with a plurality of spacers disposed therebetween and defining a predetermined space between said substrates, said space being sealed and said liquid crystal material being contained within said sealed space, each of said substrates containing a gas barrier film and an orientating film, said orientating film being in contact with said liquid crystal material, said method comprising the steps of:

placing said liquid crystal display element with the bubble formed in said liquid crystal material in a vacuum dryer; and subjecting said liquid crystal display element to a reduced pressure in said vacuum dryer while said space is sealed for a time period to remove the bubble from said sealed space.

2. The method of claim 1, wherein said reduced pressure is about 50 Torr and wherein the time period is approximately 24 hours.

* * * * *